UNITED STATES PATENT OFFICE.

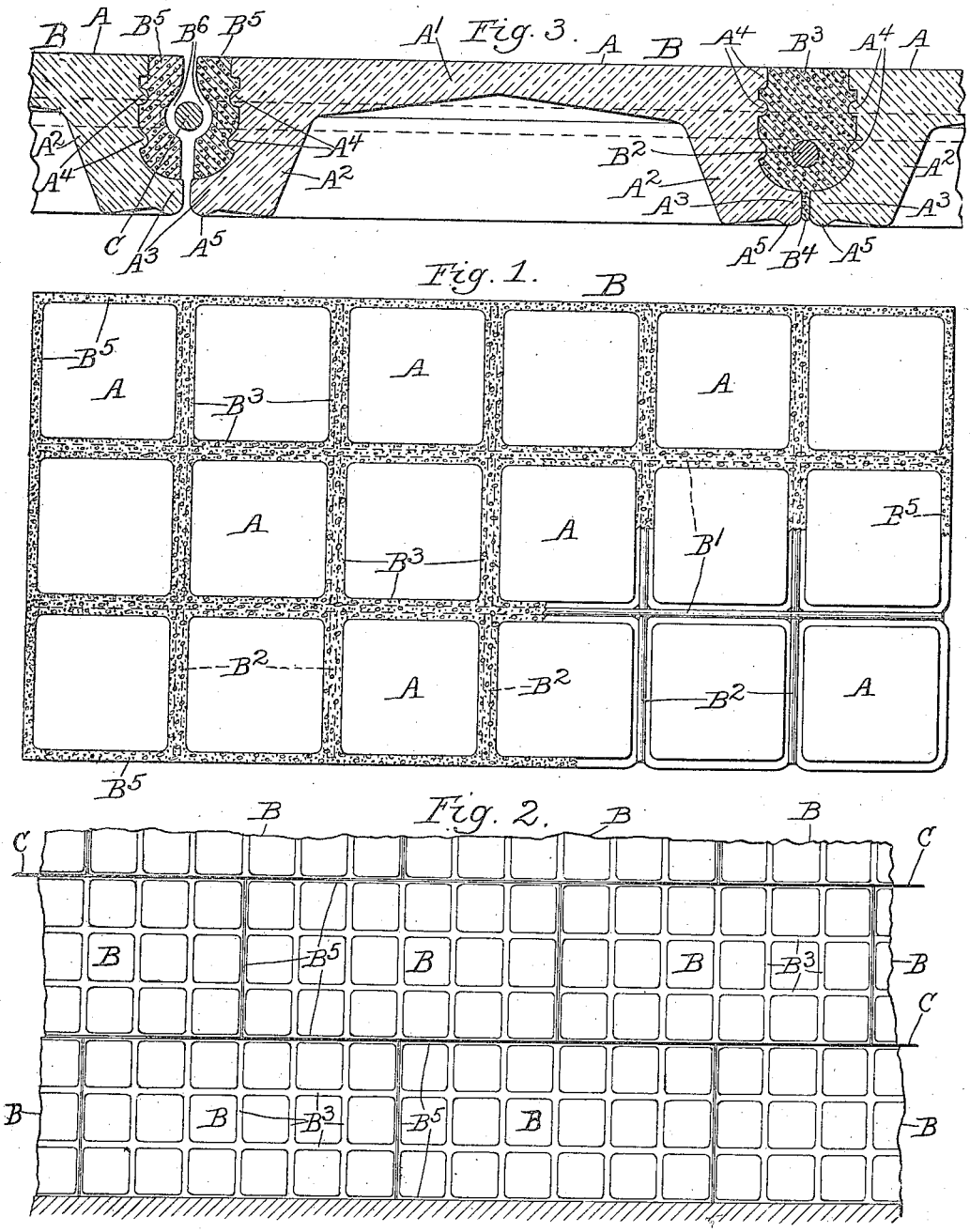

FREDERICK L. KEPPLER, OF NEW YORK, N. Y.

WALL STRUCTURE.

1,425,102.   Specification of Letters Patent.   Patented Aug. 8, 1922.

Application filed March 11, 1918. Serial No. 221,650.

*To all whom it may concern:*

Be it known that I, FREDERICK L. KEPPLER, a citizen of the United States, residing at New York, in the county of New York and State of New York, have invented a certain new and useful Improvement in Wall Structures, of which the following is a specification.

My invention relates to improvements in wall structures and has particular reference to a wall structure made up of glass or other translucent material. It has for one object to provide means whereby a number of separate identical small glass units or blocks may be assembled together into a permanent wall structure wherein the weight is supported not by the glass block themselves but by a plastic or reinforced concrete grid. Another object is to provide means whereby such small glass blocks may be made up into a series of structural units or tiles and be so made up in the factory and shipped to the point of use so that the workman will have a minimum of difficulty and delay in assembling these groups of glass blocks into a structure which when finished will have the appearance of a continuous grid supporting the separate glass blocks. Other objects of my invention will appear from time to time in the specification.

My invention is illustrated more or less diagrammatically in the accompanying drawing wherein Figure 1 is a plan view of the tile or structural unit;

Figure 2 is a side elevation showing how the separate structural units are assembled to form the wall;

Figure 3 is a section through two adjacent structural units before the plastic material which binds them together has been placed.

Like parts are indicated by like letters in all the figures.

A is a glass block or integral glass unit. This block is the basis of my whole structure so far as the glass or translucent part is concerned and the structure is made up of a multiplicity of these blocks assembled together so as to form what I have called a structural unit or tile which structural unit is in turn assembled in the wall to form the wall. The glass block itself is made up of a relatively thin glass plate $A^1$ bounded about its periphery by a flange $A^2$ which flange has a peripheral rib $A^3$ extending outwardly beyond the periphery of the glass plate. This flange and rib form a kind of a skirt extending downwardly and outwardly from the periphery of the central flat thin glass plate portion of the block. The periphery of the block is corrugated being provided with beads or outwardly projecting portions $A^4$ arranged about the periphery of the block beneath the rib. The rib itself carries about its periphery on the side farthest from the body of the block a bead $A^5$.

These separate glass blocks are made up in large quantities and kept ready for use. These separate glass blocks are assembled in what I have called a structural unit or tile B. It is called a structural unit because it is prepared before hand and taken to and built in the structure as a unit though, of course, this unit is made up of a series of similar blocks and when it is built in the structure it is merged in the structure and becomes no longer practically distinguishable.

This structural unit is made up of a large number of glass blocks as indicated. The only limit to the number of blocks which can be built into this unit is the practical working size of the unit. Under some circumstances it might be necessary to build the unit of only eight blocks instead of eighteen or a larger number of blocks might be used. The point is that ordinarily these blocks would be so arranged that the structural unit is twice as long as it is high so that it can be conveniently built in a wall just as bricks are built in though, of course, other arrangements can be and are used.

These blocks are first assembled in a group with the outer peripheries of the ribs surrounding the flanges substantially in engagement though not quite touching with the flat side of the block up. Reinforcing bars $B^1$ $B^2$ are then laid in pockets formed between adjacent blocks crossing as indicated so that there is a full reinforcing grid of wire or bar as the case may be. These pockets are then filled with concrete or other plastic material $B^3$ in which the reinforcement is embedded. This plastic material will pass down between the opposed edges of the ribs well toward the bottom face of the blocks but preferably will not be allowed to project out beyond the ribs A⁵. A filler may be used to prevent this if necessary and these ribs A⁵ will then cover and project and more or less hide the film B⁴ of plastic material between adjacent blocks. The tile or unit structure itself is surrounded by a belt of plastic material B⁵ engaging the corrugations A⁴ and resting upon the upper side of the rib A³ and surrounding the periphery of the glass plate as indicated. This belt of material is cut away or channeled as at B⁶ so that when adjacent structural units are brought together there is a pocket provided in which reinforcing bar may be located and which may then be filled with a further supply of plastic material to lock and cement the parts all together.

It will be noted that in the structural unit itself each glass block is surrounded by a grid of plastic material and that plastic material is reinforced by reinforcing bars. The result of this is that the glass itself furnishes little if any of the structural strength of the unit. You can break out half or even more of the glass blocks and still your structure will stand and be as durable as before. In other words, the reinforced grid furnishes such support that the strength of the glass units themselves is absolutely negligible, they merely fill the voids and permit light to enter.

When the structural units are to be built into the wall or building structure they are laid up in cement mortar exactly the same as bricks or fireproofing tile or anything of the kind. The joints are broken as indicated. Preferably, however, reinforcing bars are laid in the longer joints between successive tiers as indicated at C. These reinforcing bars do not need to extend throughout the full length of the structure as continuous bars but short pieces may be used or they may be embedded in place. No vertical reinforcing bars need be used. There is no place for them and the staggering of the joints of the successive tiles or units in successive tiers together with the vertical reinforcing in the tiles or units themselves furnishes sufficient vertical stability. Obviously as soon as the concrete mortar between the separate tiles or units has had time to set the whole structure will be in the form of a monolithic reinforced concrete grid enclosing and containing a number of translucent glass blocks, many, if not all of which, can be removed by breaking them out without interfering with the strength of the structure.

It will be evident that while I have shown in my drawings an operative device, still many changes might be made both in size, shape and arrangement of parts without departing materially from the spirit of my invention and I wish, therefore, that my drawings be regarded as in a sense diagrammatic.

The use and operation of my invention are as follows:—

As indicated above the tiles are assembled on a plane surface with their flat surfaces upward, their edges joining. In the interstices between them suitable reinforcing members are placed. They are then united by concrete which is poured into these interstices and which secures them together and holds the reinforcing members in place. At the same time the concrete cushion at the outer edge of the tile is molded. The tiles are then stored away until it is desired to use them. They are then transported to the place where they are to be used and are set up exactly as any tile or brick is set up by being placed in proper position and united by cement or other mortar. It will be noted that the tiles come directly together only at the edge adjacent the raised bead. There is a space left between the opposed cement cushions on the two tiles as shown in Figure 3. This space is designed to receive the cement in which they will be set up. There are provided with a further enlarged channel which is designed to receive a further reinforcing member should that be necessary.

As glass has no suction it has been found that cement or mortar in which glass is set will harden very slowly. For this reason such walls sometimes require additional bracing means while they are setting. It is to obviate this that the cement cushion around the tile has been provided. The cement itself will exert a suction upon the moist cement or mortar in which the tiles are set up and will cause it to harden very rapidly so that walls made in this fashion require no additional bracing means and may be set up exactly as any brick or earthen tile wall.

It frequently is unnecessary to have continuous reenforcing members in the continuous joints and it is not necessary to join separate reenforcing members together. Sufficient strength can be obtained by laying the reenforcing members end to end in a joint and having the reenforcing member in a parallel adjacent joint bridging the gap and there might be gaps of considerable length between ends of the reenforcing members.

I claim:—

1. As a new article of manufacture a preassembled building unit, comprising a self-supporting concrete grid, and a plurality of translucent units secured edge to edge therein, and a channeled concrete band integral with the concrete grid surrounding the entire unit.

2. As a new article of manufacture, a composite building tile comprising a plurality of translucent tile elements, the peripheries of said elements being channeled, a concrete grid enclosing said tiles and filling said channels and a channeled concrete rim about the entire tile structure.

3. As a new article of manufacture, a composite building tile comprising a plurality of translucent tile elements, the peripheries of said elements being channeled, a reinforced concrete grid enclosing said tiles and filling said channels and a channeled concrete rim about the entire tile structure.

In testimony whereof, I affix my signature in the presence of two witnesses this fifth day of March, 1918.

FREDERICK L. KEPPLER.

Witnesses:
MAURICE KEANE,
ARTHUR S. BURTON.